United States Patent
Desai et al.

(10) Patent No.: US 11,223,943 B2
(45) Date of Patent: Jan. 11, 2022

(54) SYSTEMS AND METHODS FOR PORTING COMMUNICATION DEVICES

(71) Applicant: Payfone, Inc., New York, NY (US)

(72) Inventors: Rodger Desai, New York, NY (US); Jeffrey Naujok, Colorado Springs, CO (US); Christopher Cunningham, Highlands Ranch, CO (US); Greg Bonin, Denver, CO (US)

(73) Assignee: Payfone, Inc., New York, NY (US)

( * ) Notice: Subject to any disclaimer, the term of this patent is extended or adjusted under 35 U.S.C. 154(b) by 21 days.

(21) Appl. No.: 16/789,199

(22) Filed: Feb. 12, 2020

(65) Prior Publication Data

US 2020/0260258 A1    Aug. 13, 2020

Related U.S. Application Data

(60) Provisional application No. 62/804,427, filed on Feb. 12, 2019.

(51) Int. Cl.
*H04W 4/14*        (2009.01)
*H04W 8/18*        (2009.01)
*H04W 12/06*       (2021.01)
*H04L 29/12*       (2006.01)
*H04W 12/033*      (2021.01)

(52) U.S. Cl.
CPC ......... *H04W 8/183* (2013.01); *H04L 61/6054* (2013.01); *H04W 4/14* (2013.01); *H04W 12/033* (2021.01); *H04W 12/06* (2013.01)

(58) Field of Classification Search
CPC ... H04W 8/183; H04W 12/033; H04W 12/06; H04W 4/14; H04W 8/28; H04W 12/02; H04W 12/0431; H04W 12/0013; H04L 61/6054
See application file for complete search history.

(56) References Cited

U.S. PATENT DOCUMENTS

| 2008/0261561 | A1  | 10/2008 | Gehrmann |
| 2011/0151843 | A1* | 6/2011  | Deuel ............... H04L 41/0806 455/414.1 |
| 2014/0199962 | A1* | 7/2014  | Mohammed ........... H04W 4/60 455/406 |

(Continued)

OTHER PUBLICATIONS

PCT Application as filed on Feb. 12, 2020, Application No. PCT/US20/17966, 53 pages.

(Continued)

*Primary Examiner* — Chuong A Ngo
(74) *Attorney, Agent, or Firm* — Berkeley Law & Technology Group, LLP

(57) ABSTRACT

A communications management system for implementing a freeze on electronic transactions. For example, a device management system provides a means of preventing the porting of at least one communication device account—such as a cellular phone number—from one carrier to another through a list of identifiers that include phone numbers, device identifiers, or personal identifiers that have been enrolled in the device management system through an interface by an authorized user. Advantageously, the device management system provides a revision to the existing phone porting architecture and enables fraud detection and prevention.

21 Claims, 6 Drawing Sheets

(56) References Cited

U.S. PATENT DOCUMENTS

2015/0230088 A1 8/2015 Barkan
2018/0212971 A1* 7/2018 Costa .................. G06F 21/6209

OTHER PUBLICATIONS

Notification of the International PCT Application No. and of the International Filing Date, PCT Application No. PCT/US20/17966, dated Mar. 6, 2020,1 page.
Notification Concerning Payment of Prescribed Fees, PCT Application No. PCT/US20/17966, dated Mar. 6, 2020, 2 pages.
International Preliminary Report on Patentability, PCT Application No. PCT/US20/17966, dated Feb. 17, 2021, 21 pages.
Invitation to Pay Additional Fees, PCT Application No. PCT/US20/17966, dated Apr. 21, 2020, 2 pages.
Response to Invitation to Pay Additional Fees, PCT Application No. PCT/US20/17966, filed May 21, 2020, 3 pages.
International Search Report, PCT Application No. PCT/US20/17966, dated Jun. 25, 2020, 4 pages.
Written Opinion, PCT Application No. PCT/US20/17966, dated Jun. 25, 2020, 7 pages.
Chapter II Demand and Article 34 Amendment, PCT Application No. PCT/US20/17966, filed Oct. 23, 2020, 20 pages.

* cited by examiner

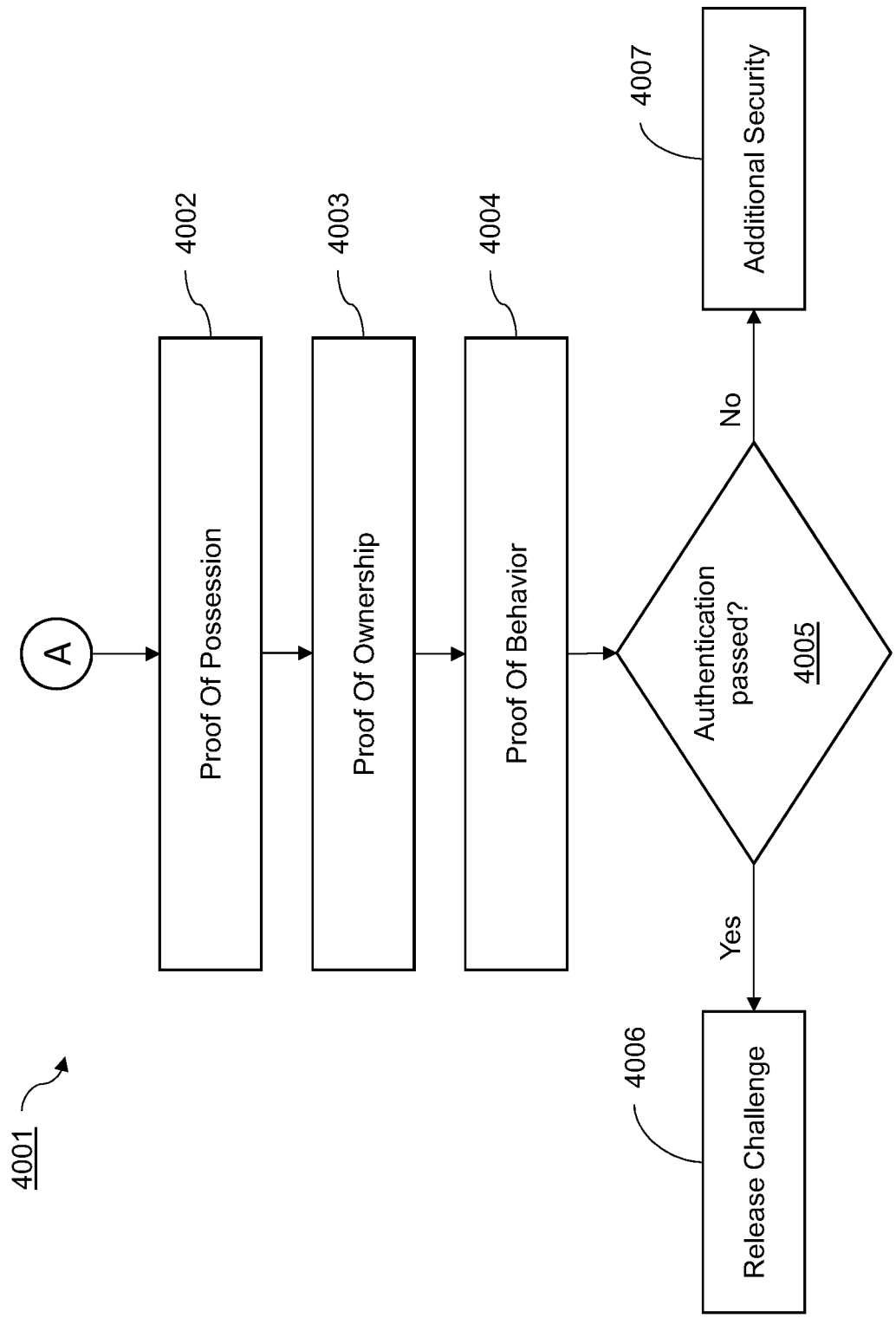

SYSTEMS AND METHODS FOR PORTING COMMUNICATION DEVICES

CROSS-REFERENCE TO RELATED APPLICATIONS

This application claims the benefit of and priority to U.S. Provisional Application No. 62/804,427, filed Feb. 12, 2019, which application is hereby incorporated herein by reference in its entirety and for all purposes.

FIELD

The present disclosure relates generally to computer software systems and more specifically, but not exclusively, to systems and methods for managing the porting of communication devices.

BACKGROUND

Porting is the process by which the ownership of a phone number and its corresponding device is transferred from one carrier to another. The most common form of this is when a cell phone user transfers from one carrier (e.g., T-Mobile) to another carrier (e.g., AT&T) and their account, phone number, and/or device are transferred to the new carrier.

Porting is accomplished through a series of computerized exchanges between the carriers involved in the transfer, and the other providers who participate in the North American Number Plan (NANP) system. All carriers, and other parties qualified to join the network, that have registered an interest in pre-ports can see this pre-porting exchange occurring and can provide input on the transfer.

Currently one of the largest sources of fraud is the illicit porting of devices (e.g., phones) by persons other than the owners—a problem that prior art systems failed to consider. Instead, prior art systems essentially ignored fraudulent porting because the primary risk at the time was duplicate telephone numbers and/or intercepted text messages. However, in recent years, smart phone devices and their associated phone numbers are often integrally tied to a user's identity and can control important user assets (e.g., bank accounts, passwords, identification, and so on). Accordingly, fraudulent porting is now a serious risk and currently costs users (and the industry) millions of dollars per month, not including the fraud that occurs after the phone is ported.

Unfortunately, conventional device management systems are not sufficiently robust to detect any fraudulent activity or to permit fraudulent porting victims (e.g., phone customers) to interface with the conventional porting process. Current systems can authenticate porting requests over a virtual private network (VPN) but fail to authenticate the origin of the request. In other words, the current systems assume porting requests are non-fraudulent and only confirms the execution of the request.

Current systems lack the detailed technical knowledge of the operation of the phone systems and the individual interfaces required for each of the carriers to authenticate the origin of the request. In fact, carriers have acknowledged this difficulty with attempts to provide a single interface for this authentication. However, this single interface, or even a specification for one, does not exist. Accordingly, these systems are unable to analyze the real time flow of porting requests, which can be more than one million events per day, at bursts of more than one hundred requests per second.

As an additional challenge, blocking a port requires establishing ownership of the device, maintaining the established ownership, and monitoring the behavior of the ownership to prevent a non-owning party from changing the status of the device in such a way as to allow a port to occur. This triumvirate of data represents large swathes of data and logic that is technically challenging to establish, monitor, and maintain.

By way of example, multiple feeds of data from multiple providers—many of which are in non-standard formats or contain superfluous data—must be processed and analyzed for relevant data. In some cases, a contracted provider of the NANP Administration (NANPA) sends data which appears to specify ports of the phone from one carrier to another, even when a carrier is simply transferring a home region of the phone from one area within the company to another area within the company. This happens to a number of devices on any given day yet has no impact on the device's ownership—nor should it be considered an indicator of the user's intention to port. Although merely a transfer within the system of a single company, these ports appear to be the same as a carrier-to-carrier port which would, and should, have behavior impact. Distinguishing between transfers within a system and carrier-to-carrier ports involves an extremely technical set of branching logic (e.g., fuzzy matching, time dependent analysis, and so on).

In view of the foregoing, a need exists for an improved communications management system and method for managing porting of communication devices in an effort to overcome the aforementioned obstacles and deficiencies of conventional communication systems.

BRIEF DESCRIPTION OF THE DRAWINGS

FIG. 4 is an exemplary flow diagram illustrating one embodiment of a method for determining whether to freeze a pre-porting request using the device management system of FIG. 1.

Figure 1:
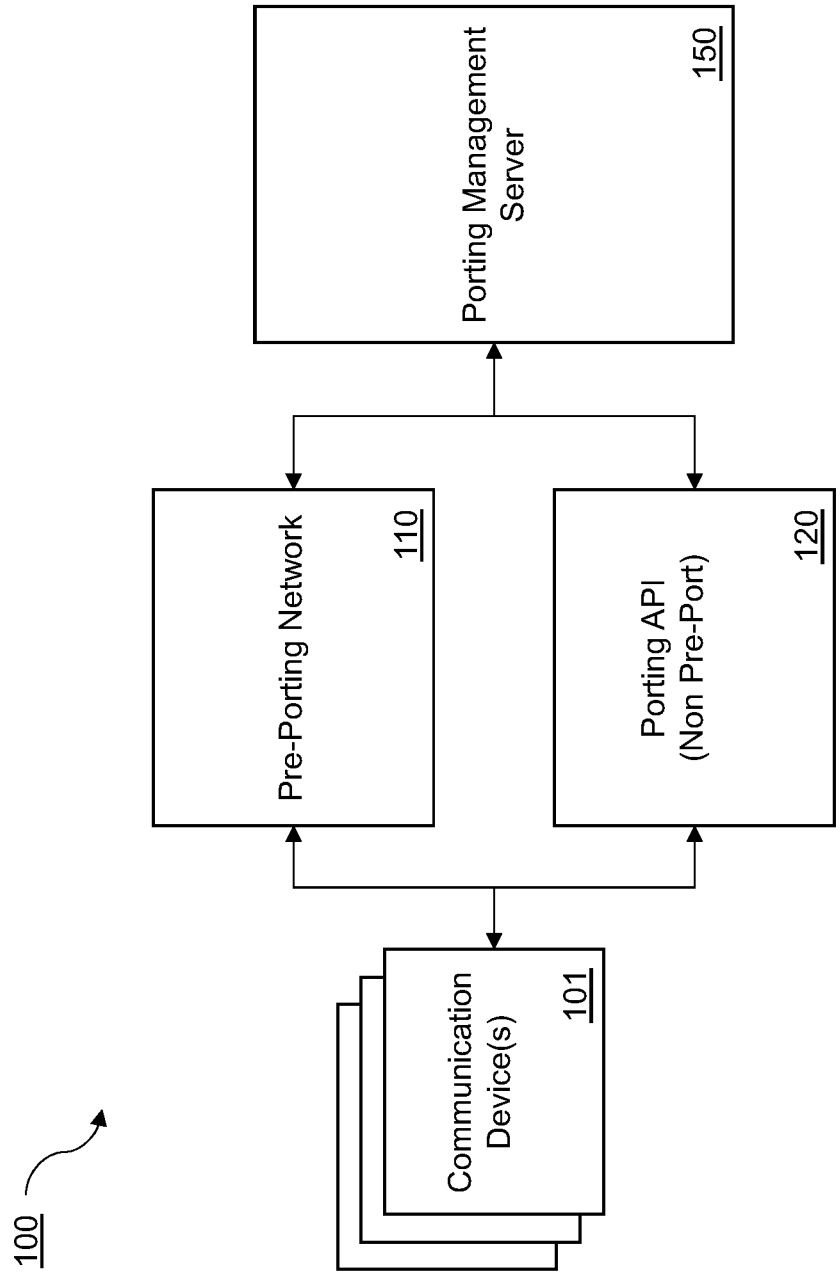
FIG. 1 is an exemplary top-level block diagram illustrating one embodiment of a device management system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available device management systems are deficient because they fail to authenticate the origin of a porting request, cannot detect and prevent fraudulent activity, and deny the potential victims of fraudulent porting the ability to interface with the porting process, a device management system that intercepts porting requests can prove desirable and provide a basis for a wide range of communications applications, such as the ability to prevent ports which may be fraudulent, prevent credit fraud, enable parental controls, and so on. These results can be achieved, according to one embodiment disclosed herein, by a device management system 100.

The device management system 100 provides a means of preventing the porting of at least one communication device 101—such as a cellular phone—from one carrier to another through a list of identifiers that include phone numbers, device identifiers, or personal identifiers that have been enrolled in the device management system 100 through an interface by an authorized user. Advantageously, the device management system 100 provides a revision to the existing phone porting architecture and enables fraud detection and prevention.

Turning to FIG. 1, the device management system 100 includes at least one porting management server 150 in operable communication with a pre-porting network 110. In some embodiments, the porting management server 150 communicates with the pre-porting network 110 through an encrypted channel, thereby creating a virtual private network (VPN) with other members of the pre-porting network 110. The pre-porting network can be implemented as a Software as a Service (SaaS) network. In some embodiments, participation in the pre-porting network 110 requires the pre-exchange of cryptographically large keys before access to the VPN is permitted. Messages transmitted through the pre-porting network 110 can be encrypted during-transmission, for example, using already established SaaS protocols (e.g., extensible markup language (XML) interfaces, application programming interfaces (APIs), and so on).

In a preferred embodiment, an Operator Company Number (OCN), assigned by the National Exchange Carrier Association (NECA) and used to identify a selected telecommunications carrier is required to access the pre-porting network 110. The pre-porting network 110 can host a list of pending pre-port requests. By way of example, third party companies can provide access (e.g., via APIs) to a software-driven network for a Service Order Administration (SOA). The SOA provides a modern ordering system to port telephone numbers and interfaces directly with a Number Portability Administration Center (NPAC) telecommunications network for executing porting requests. However, those of ordinary skill in the art would appreciate that any number of interfaces and software-driven networks for hosting pre-porting requests can be used.

A selected pre-porting request is routed between a current owner of the communication device 101 to be ported, the requesting owner of the communication device 101, and any member of the pre-porting network 110 who has requested pre-port information, such as for ensuring routing continuity.

With reference to FIG. 1, the porting management server 150 participates in the pre-porting network 110, which is a cooperative network between all the carriers. Accordingly, access to the servers or databases (not shown) of other carriers participating in the pre-porting network 110 is not required. Although shown and described as having direct access to the pre-porting network 110, those of ordinary skill in the art will appreciate that the porting management server 150 can reside at any location that can participate in the pre-porting network, directly or indirectly via wired and/or wireless communications networks.

Suitable wireless communication networks can include any category of conventional wireless communications, for example, radio, Wireless Fidelity (Wi-Fi), cellular, satellite, and broadcasting. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

During the pre-porting process of a phone number associated with a selected communication device 101, the carrier seeking to take possession of the phone number of the selected communication device 101 requests the right to transfer that phone number from the existing carrier over the pre-porting network 110. The pre-porting request includes a number of attributes relating to the transfer, including, for example, a phone number to port, an existing carrier, a destination carrier, a name, address, and other biographical information of the account holder, an identifier of a mobile subscriber account with a mobile service provider, a mobile subscriber unique alias, an international mobile subscriber identifier (IMSI), an integrated circuit card identifier (ICC ID), and so on.

Figure 2:
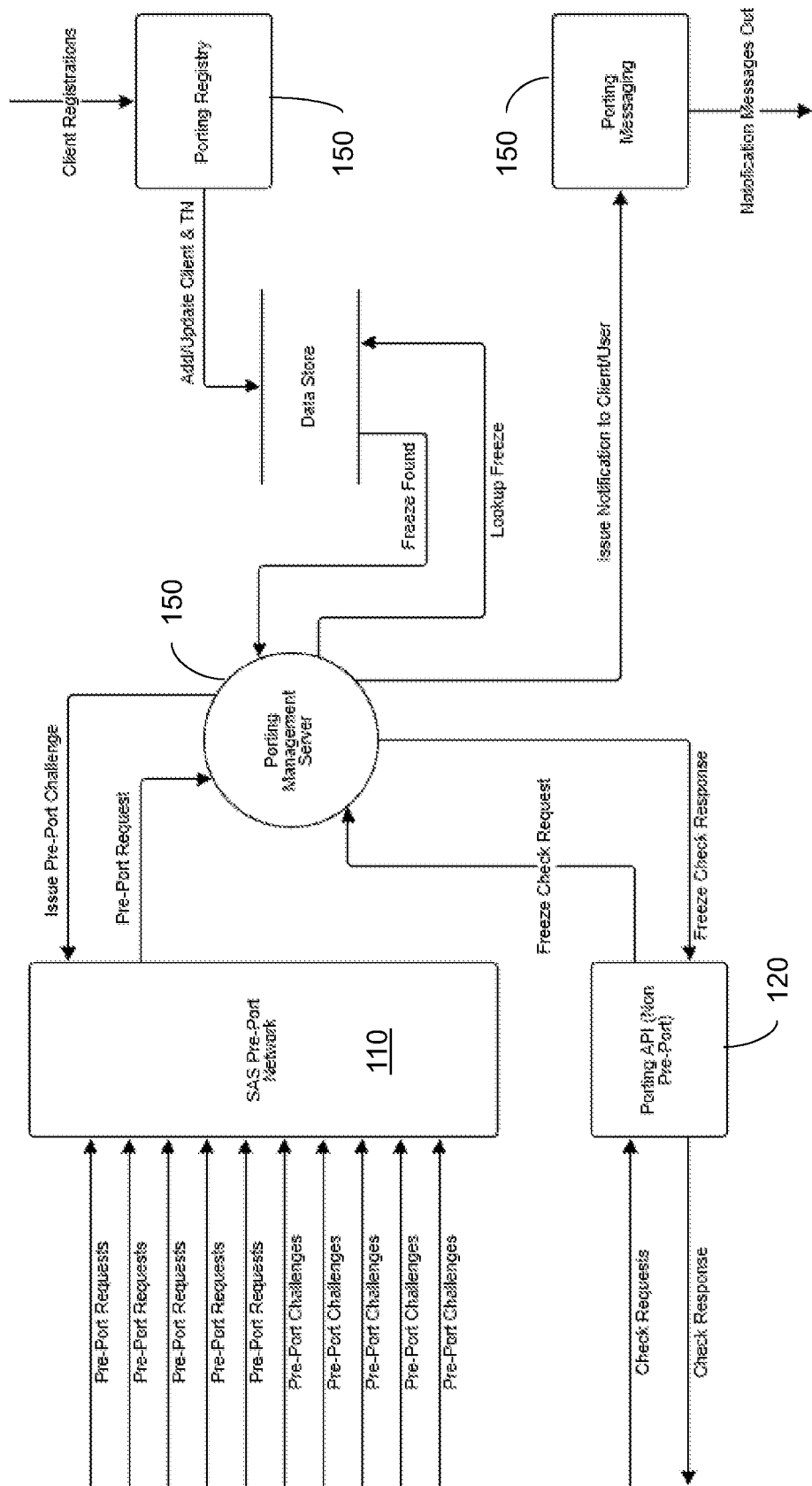
FIG. 2 is an exemplary data flow diagram illustrating another embodiment of the device management system of FIG. 1.

Turning to FIG. 2, when the pre-port request is issued, that request is forwarded to the porting management server 150 and any other interested party. For example, this could occur by the request being broadcast to the pre-porting network 110 and the porting management server 150 can receive and/or intercept the request by participating in that network. As a participant in the pre-porting network 110, if the device is identified in the list of known identifiers (e.g., using attributes within the pre-port request, such as the telephone number and the name), the porting management server 150 responds to the pre-port request with a "challenge," blocking the port process. The list of known identifiers can be established in a number of different ways. For example, if a bank or other institution wanted to prevent fraudulent transfers of the phone numbers of its customers, the bank could provide a set of identifiers for its customers to be monitored. As another example, users who wish to protect their communication devices 101 can provide their information for addition to the list of known identifiers. In some embodiments, identifying the device is in the list of known identifiers can further include a cross-check against phone numbers, device identifiers, and/or personal identifiers.

Additionally and/or alternatively, in some systems one or more carriers may not broadcast pre-porting requests to the entire pre-porting network 110, instead relying on communications only to a user's existing carrier. As a result, the device management system 100 may not be aware of a pre-porting action. In such embodiments, the advantages of the present system can still be accomplished by using the device management system 100 to initiate a pre-port request on behalf of users seeking porting protection. These pre-porting requests are left open indefinitely without completing them. For example, in some embodiments, users who wish to protect their communication device 101 can register the device with the porting management server 150, which places the communication device 101 into a pre-port state. The existence of this open pre-port request will block any future attempts to port the communication device 101. When users legitimately want to port their devices, they can contact the porting management server 150 in a secure fashion and ask for the pre-port to be canceled. This advantageously provides the same effect as the "challenge" described herein, blocking the port process. Alternatively, a hybrid approach could be employed where this method of automatically issuing a pre-port request is only employed for users with carriers that do not broadcast system-wide pre-port requests.

In some embodiments, users can select whether any porting attempt should trigger a "soft" freeze or a "hard" freeze. By way of example, a soft freeze challenges the port and pauses the process giving time to try and authenticate the port. For a "soft" freeze, the porting management server 150 can notify the user via their device using short message service (SMS) or other method to request that they allow the port. In some embodiments, the "challenge" can be broadcast on the pre-porting network 110.

A hard freeze, on the other hand, immediately denies the port transfer. While the hard freeze results in an automatic denial, the device management system 100 can still, advantageously, send an SMS or other phone alert to the user to inform them that a pre-porting request has occurred and has been denied.

Conventionally, challenges are only used by the current carrier of a selected communication device 101 when there are billing issues or other reasons not to port the selected communication device 101. Contrary to this conventional usage, the challenge used herein prevents ports which may be fraudulent. In other words, the issued challenge causes the porting process to stop at this point unless the requesting carrier can release the challenge on the port.

As described above, currently-available device management systems are deficient because they fail to authenticate the origin of the porting request. Advantageously, the device management system 100 determines the certainty of the holder of the device (e.g., identity and/or confidence value of the identity via fuzzy matching) as the porting management server 150 reviews received port requests—or other events that can be potentially challenged. The porting management server 150 attempts to authenticate the origin of the pre-porting request and determine the identity of the owner of the request in any manner described herein, such as through an exemplary process 3000, shown in FIGS. 3A-B.

Figure 3A:
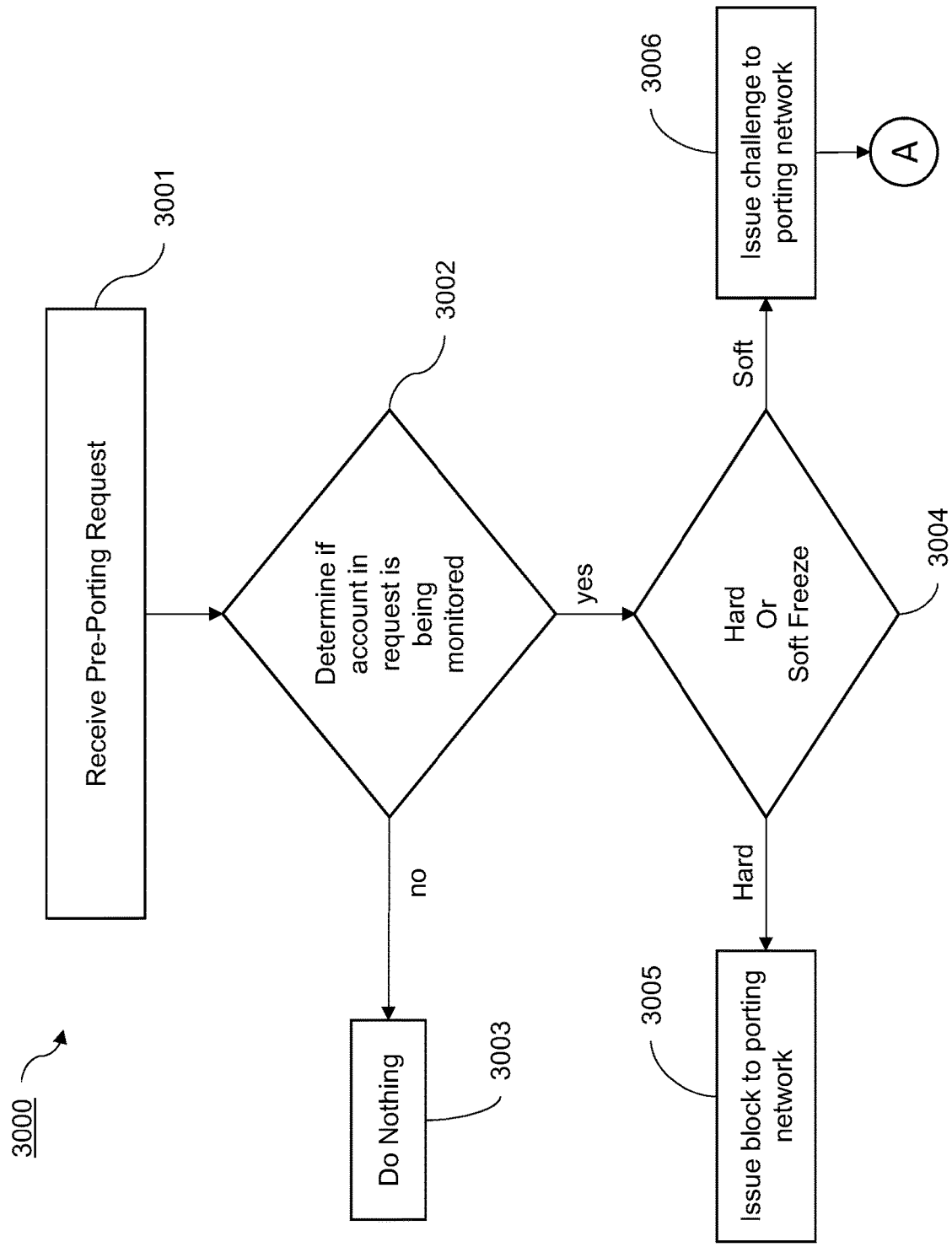
FIG. 3A is an exemplary flow diagram illustrating one embodiment of a method for managing a pre-porting request using the device management system of FIG. 1.

Turning to FIG. 3A, the porting management server 150 receives the pre-porting request (at step 3001). Once the pre-porting request is received, the porting management server 150 determines whether the account in request is being monitored (step 3002), for example, by consulting the list of known identifiers. If the device is not identified in the list of known identifiers, the porting management server 150 does nothing (step 3003) and the porting request is processed as is known in the art.

If the device is identified in the list of known identifiers, the porting management server 150 determines whether the account in request has requested a hard or soft freeze (decision block 3004). If a hard freeze is requested, a block is issued to the porting network (step 3005), thereby immediately denying the port transfer. In some embodiments and as described above, the device management system 100 can still, advantageously, send an SMS or other phone alert to the user to inform them that a pre-porting request has occurred and has been denied. Furthermore, in other advantageous embodiments, a system might only apply hard or soft freezes for all monitored accounts and this determination of hard or soft can be omitted.

If a soft freeze is requested, the porting management server 150 responds to the pre-port request with a "challenge" (step 3006), thereby causing the porting process to stop at this point unless the requesting carrier can release the challenge on the port. In other words, the porting request is temporarily halted to advantageously prevent ports which may be fraudulent. In some embodiments, the porting management server 150 can notify the user, for example, via their device using SMS or other method to request that they allow the port. If the user approves the port, the challenge can be released, thereby confirming that the port can proceed.

Figure 3B:
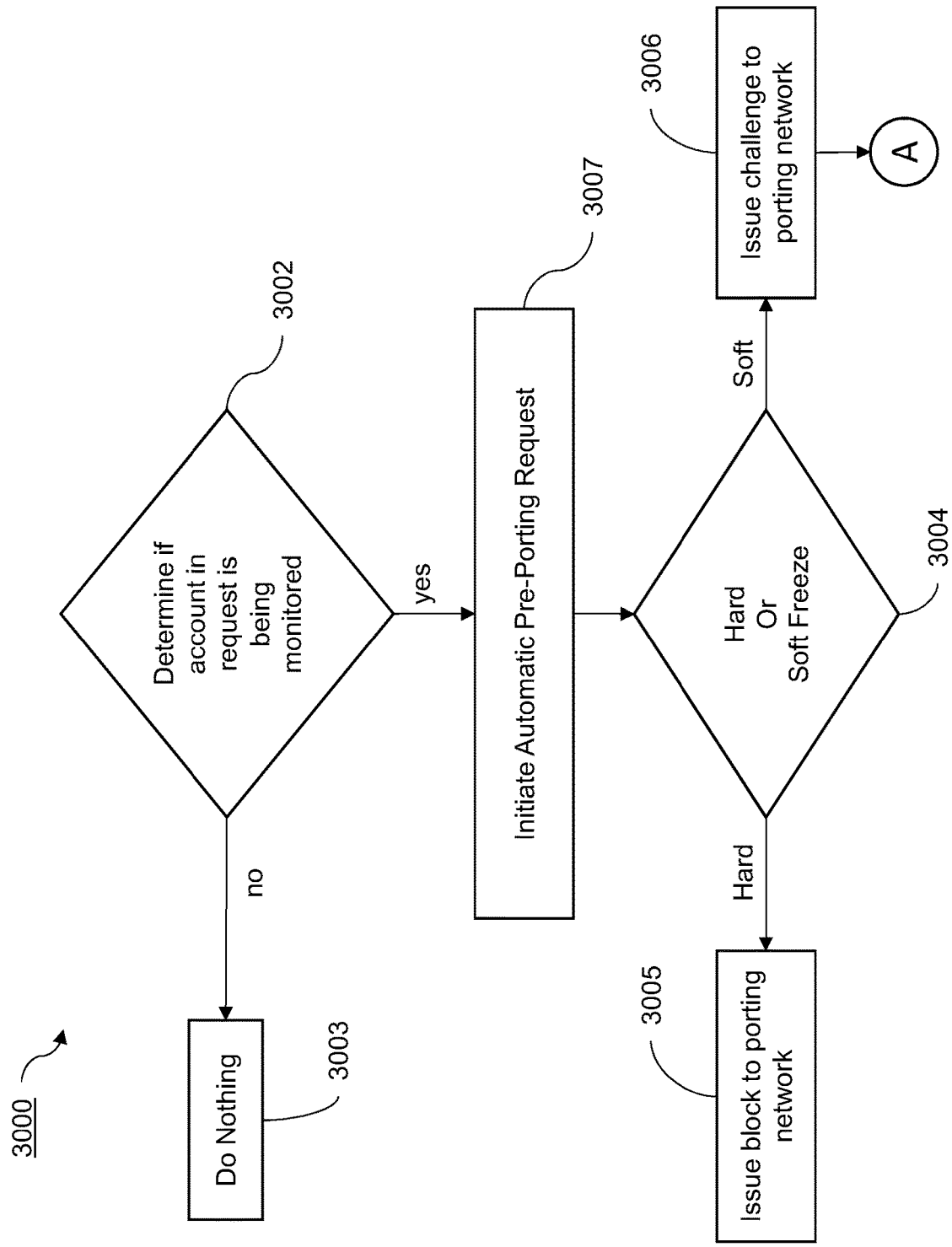
FIG. 3B is an exemplary flow diagram illustrating another embodiment of a method for managing a pre-porting request using the device management system of FIG. 1.

As previously described, in some systems where the pre-port request is not broadcast in the pre-porting network 110, the device management system 100 can immediately initiate a pre-port request on behalf of users without completing the request, such as shown in FIG. 3B. Similar to the process shown in FIG. 3A, the porting management server 150 first determines whether the account is being monitored (step 3002), for example, by consulting the list of known identifiers. Additionally and/or alternatively, any time a user registers with the device management system 100, their communication device 101 can automatically be added to the list of known identifiers and/or marked with a flag to indicate that the account is being monitored. If the device is not identified in the list of known identifiers, the porting management server 150 does nothing (step 3003) and the porting request is processed as is known in the art.

However, because the pre-port request was not intercepted in this embodiment, the porting management server 150 can immediately place the communication device 150 in a pre-port state without completing the port (step 3007). This advantageously prevents any additional, likely fraudulent, pre-port requests from being processed as the communication device 150 is already in progress with a pre-port that was initiated by the porting management server 150. Once placed in the pre-port state, the porting management server 150 continues as described above to determine whether the selected account has requested a hard or soft freeze (decision block 3004).

FIG. 4 and the following discussion discloses a number of advantageous systems and methods 4001 for confirming the authenticity of the port request and thereby approving a release of a soft freeze challenge discussed above. Notably, in various embodiments, the authentication techniques 4001 can each advantageously be used alone, or they can be used in combination, e.g., a system might use only one technique, it might use all three techniques, or it might only use the any two of the techniques. Turning to FIG. 4, the device management system 100 can advantageously establish a proof of possession (at step 4002). In other words, the porting management server 150 can determine that the user requesting the port of the number associated with communication device 101 is the person in possession of the communication device 101.

For example, the porting management server 150 can advantageously confirm the port is being authorized by a person in possession of the communication device 101 using identity authentication methods, such as a subscriber-identify module (SIM)-based authentication, as described in commonly owned U.S. Pat. No. 9,906,954, entitled "Identity Authentication" to McClement et al., U.S. Pat. No. 9,747,596, entitled "System and Method for Registering a Mobile Subscriber For Authentication" to Brody et al., which patents are hereby incorporated by reference in their entirety and for all purposes. Additional illustrative embodiments for identity authentication are further described in commonly owned U.S. Pat. No. 8,606,640, entitled "System and Method for Paying a Merchant by a Registered User Using a Cellular Telephone Account" to Brody et al., U.S. Pat. No. 9,767,449, entitled "System and Method for Detecting a Suspicious Transaction" to Brody et al., and U.S. Pat. No. 9,679,285, entitled "System and Method for Paying a Merchant by a Registered User Using a Cellular Telephone Account" to Brody et al., each of the disclosures are hereby incorporated by reference in their entireties and for all purposes.

Authentication of possession advantageously ensures that the device associated with the account is in use and that the possessor of that device approves the transfer before the port is executed. To summarize an exemplary process, according to the techniques detailed in the patents cited above, the porting management server 150 can send an SMS message containing a link back to the management server 150 or a related computer system to the phone number associated with the communication device 101 that is the subject of the attempted port. Importantly, merely sending the SMS message is insufficient to ensure device possession. This is because SMS messages are easily and routinely forwarded to other devices. The present system advantageously uses the link contained within the SMS message to confirm possession of the device. In particular, once the link is clicked on the communication device 101, the porting management server 150 receives the link request. Now that the porting management server 150 is in direct communication with the communication device 101 that clicked the link, it can determine this is the device associated with the phone number to be ported. For example, the porting management 150 can authenticate that the device requesting the link contains the SIM card associated with the phone number, such as described further below. This strong cryptographic authentication provides a high degree of confidence that a person in possession of the communication device has authorized the requested port. In some embodiments, the porting management server 150 authenticates the communication device by querying for a current international mobile subscriber identifier (IMSI) associated with a mobile telephone number of the communication device and comparing at least the current IMSI and an IMSI associated at the time of the porting request with the received mobile telephone number.

In advantageous embodiments, passing this authentication—alone or in combination with other tests—causes the porting management server 150 to send a message to the pre-port network 110 releasing the challenge. The possession authentication, however, does not avoid situations where a bad actor has stolen or otherwise acquired the communication device 101 associated with the account. Thus, the additional authentication provided below may be warranted.

The porting management server 150 proceeds to establish a proof of ownership (at step 4003), such as through fuzzy matching of user identity to the correct owner of the communication device 101 using multiple data sources (e.g., NANPA porting databases, carrier databases, address data, and other personal information) to confirm the correct identity of the owner of the communication device 101. In other words, the proof of ownership takes information provided in the pre-port request (e.g., the name and address of the person requesting the port) and compares that with the expected information about the owner of the phone number contained in the records of the port management server 150. Those of ordinary skill in the art will appreciate that a variety of record linkage techniques can be used for determining the same entity across different data sources that may not share a common identifier (e.g., database keys, national identification numbers, and so on). Once established, the porting management server 150 can also determine any other phone numbers of devices owned or related to that owner of the selected communication device 101.

In an advantageous embodiment of the proof of ownership analysis, attributes from the pre-port request can be used with fuzzy matching techniques to determine that the request to port is from an authorized user. For example, through use of the Damerau-Levenshtein distance algorithm, the information provided in the port request can be matched against the expected data for that account to yield a distance score. The need for fuzzy matching occurs because, for example, a selected pre-port request can list "Jeff" as the user requesting the port. But the information on record about the user might list his name as "Jeffrey." This mismatch would impact the distance score, but perhaps not enough to cause it to fall beneath a predetermined threshold. Advantageously, other data in the pre-port request—such as the users address, credit card, age, or sex—can be included in the fuzzy matching evaluation and the ultimate distance score. After performing the evaluation, a distance score is determined that can be compared to the predetermined threshold result. If the result fails to pass the threshold, the ownership test fails, and the requested port will be rejected. By way of example, a threshold of 70% (i.e., 30% modifications to port data needed to complete a match) can be used or any other predetermined threshold as desired. Proof of account ownership through matching of data in the port-request can advantageously avoid port transfers initiated by unauthorized users. There are, however, situations where identity theft may enable unauthorized users may be able to provide the correct ownership data. Accordingly, using the other authentication techniques disclosed herein in addition to proof of ownership advantageously enables stronger protections.

The porting management server 150 can further authenticate the requested port change by establishing proof of behavior (at step 4004). The porting management server 150 or related computer systems advantageously maintains a history of user activity related to their phone account and their devices, such as how long the user has had the current account, how often the changes their device, and/or how often the user changes SIM cards. The porting management server 150 can also access more granular information about the user's use of her phone. For example, the system may have information about the user's attempt to log into services such as banks, retailers, credit cards, payment systems, etc. By analyzing all of this information, a behavior score can be derived that articulates the riskiness of the current transaction and/or user's account. For example, if a user regularly changes her device every two years a number port about two years after the last device change would not inconsistent with her expected behavior. A user in this case would have a high behavior score and would pass the behavior threshold. Conversely, many recent changes to a user's tracked information would lower the behavior score and lead to a failure of the behavior authentication. For example, if the user had already ported his number in the past few months the behavior score would be low and a subsequent attempt to port might not pass the behavior threshold.

In some embodiments, a trust score can be derived from the behavior score and/or other non-behavior based characteristics indicative of a user's overall trust. Or the trust score can be derived from characteristics indicative of the trust level of a particular transaction as desired. By way of example, non-behavior characteristics might include state-based variables, line type (e.g., mobile, VoIP, landline). Behavior-based characteristics, as described above, might include device changes or SIM changes over a period. For example, a device or SIM change in the last 30-days might be indicative or risky behavior and lower a user's score accordingly. Or, as another example, three SIM changes in the last 90 days might also indicate risky behavior that would lower a user's score.

Returning to FIG. 4, after performing the authentication tests, the porting management server 150 determines whether the tests have been passed (at step 4005) to ensure that authenticity of the requested port transaction. Authentication can be found to be passed only if all tests are passed or it can be found to be passed if some subset of the tests have been passed. This choice of what constitutes a pass can be made consistent with the needs of the system designer. In the case where authentication is passed, flow proceeds to step 4006 and the porting management server communicates a release message over the pre-port network, which, assuming there were no other challenges from other entities, would allow the porting process to proceed to completion. Alternatively, if the authentications were not passed, the flow proceeds to step 4007 for further processing. This could include sending a port block message over the pre-porting network to prevent porting. Or it could trigger a more intensive review of the port request to confirm its authenticity.

Note that in the case where each authentication proof must be passed, the determination made at 4005 could alternately be performed after the completion of each authentication test such that if an authentication is failed the system immediately moves to step 4007 without needing to run subsequent authentications. This can advantageously allow for ordering the tests such that easiest, or most critical, authentication is run first. More complex or expensive tests can then advantageously only be run if the preceding tests are passed.

Following the above procedure, when a port or other event request arrives that will potentially be challenged, there is a level of certainty of the holder of the communication device 101. Furthermore, through the knowledge of the other communication devices 101 that is associated with the same owner and their corresponding phone numbers, the device management system 100 can verify that any request to un-freeze must come from an authentically owned device, using the same process outlined herein.

Additionally and/or alternatively, and with reference to FIG. 2, when a challenge is issued, the porting management server 150 can use the personal identifier to contact the owner of the selected communication device 101 and determine whether the request to port is authorized. However, in some embodiments, if the porting management server 150 determines that the user account in question has a low trust score as discussed above, the porting management server 150 will not contact the (likely) fraudulent owner of the selected communication device 101 for a soft freeze and will proceed immediately to implement a hard freeze.

In some embodiments, because of the authentication techniques 4001, the correct user of the selected communication device 101 is conducted with regard to some or all of the devices related to the user. As discussed above for Proof of Possession 4002, SMS-based notifications can be used to initiate a subscriber identity module (SIM)-based authentication, as described in commonly owned U.S. Pat. No. 9,906,954, entitled "Identity Authentication" to McClement et al., U.S. Pat. No. 9,747,596, entitled "System and Method for Registering a Mobile Subscriber For Authentication" to Brody et al., which patents are hereby incorporated by reference in their entirety and for all purposes. This authentication advantageously uses the effectively unbreakable encryption technology embedded in the SIM of mobile devices.

The use of the anti-fraud authentication discussed herein advantageously triggers a simple and inimitable freeze. For example, the SIM-based encryption encrypts all data as it travels through the pre-porting network 110. In a preferred embodiment, only a selected carrier holds the decryption key to the SIM, and since the encryption key is only present in the circuits of the SIM itself, the selected carrier can be certain that the device at the other end of the pre-porting network 110 is the correct device.

The porting management server 150 can confirm the transaction in any manner described herein. By way of example, the porting management server 150 transmits an SMS to a selected communication device 101 with a hyperlink to confirm (or deny) the transaction. Clicking on the link triggers a SIM-based authentication. If the selected communication device 101 is correctly associated with the user, the result of the click on the hyperlink is a web page including options for accepting or denying the request. Additionally and/or alternatively, a separate number can be contacted or another SMS authentication can be transmitted to other associated communication devices 101). If all authentication methods fail, the challenge remains in a deny state. This ensures that only the authorized user can release the challenge on the port of the device and advantageously notifies the authorized user of an attempted port.

The use of the pre-porting "challenge" indicator has never been used in a customer-friendly way to prevent fraud. Accordingly, the authentication and identification methods described herein can be used with the pre-porting challenge to confirm that only a validated user could make use of the interface to initiate or release a challenge. This technique can also be advantageously applied to authenticate transactions beyond phone number porting requests.

In an exemplary application, assume a bank has a depositor with a mobile accessible account containing more than $5000. The bank can determine that such an account is a ripe target for fraud. With reference to FIG. 2, the bank can register with the device management system 100 to monitor pre-porting and other ownership transfer requests via the communication device 101. The depositor can be notified on their communication device 101 (e.g., via a mobile application (not shown)) that additional fraud protection has been added to their account. As described above, this notification can trigger a SIM-based authentication to identify the communication device 101 and uses that authorized phone number to initiate the challenge/freeze. This challenge includes adding the phone number and, by extension, the user to the registry of the porting management server 150.

This account could potentially be exploited as follows. Assuming a criminal finds a balance slip left in an automated teller machine (ATM) for this account, which identifies both the balance and name on the account. Using compromised information about the user from third party data sources, the criminal can discover the phone number of the user. The criminal can then attempt an unauthorized port of the number at a new carrier. When the new carrier begins the pre-port, the porting management server 150 intercepts the request and finds the number on the registry. The porting management server 150 issues a challenge to the port and simultaneously issues an SMS message to the communication device 101 requesting authorization or denial of the port.

The SMS message includes a link that triggers another authentication of the communication device 101, ensuring that the communication device 101 being used to answer the link is the correct and proper device before presenting the accept/decline option screen.

If the port is accepted, the porting management server 150 rescinds the challenge to the pre-port, allowing the port. If the request is denied, the porting management server 150 can re-issue the challenge with an additional note that this is potentially fraud. In some embodiments, at this point, the port request is denied. Additionally, and/or alternatively, such a fraud request also marks any subsequent ports within a predetermined time period (e.g., 24 hours) as a fraud event, providing feedback to entities interacting with the device that the device should now be considered as fraudulent if such a denial of the port is overridden.

In other advantageous embodiments the system can be used for authentication outside of the phone porting context. For example, a credit card company provides a mobile application and registers their card-holders with the device management system 100 using their customer identifiers and customer data (e.g., name, address, and so on), and a unique identifier (e.g., social security number (SSN), birthday, etc.). This credit card company can register with the port monitoring management service using a non pre-porting API 120 shown in FIGS. 1 and 2. Using matching of the customer data, the porting management server 150 identifies the phone numbers associated to that customer. In this case, when a credit request over a predefined limit is made, the company confirms the customer identifier with the porting management server 150 and a transaction callback either to the customer or to the merchant. Using the registry (shown in FIG. 2), a phone number is identified, and an SMS sent to the device containing a link to force authentication. The user then accepts or declines the request. In either case, the callback location is sent the result: an accept, a decline, or a "no answer" response. In the case of the decline, the transaction can immediately be marked as fraudulent, likely before the transaction is even completed, and the actual cardholder is immediately alerted to fraudulent activity. In the case of no answer, additional security measures can be implemented, or the company can request an additional check on any other phone numbers known to be owned by the cardholder.

The above described system also provides for preventing other sorts of fraud. For example, in the case of the credit card company some card users may make charges and then claim they are illegitimate, i.e., "malicious insider" fraud. A transaction accepted by a registered user in accordance with the above system and method can be confirms the transaction and shows that it was and should be considered legally binding. Thus, by using the device management system 100 a certified holder approves the actual purchase and avoids malicious insider fraud.

In some embodiments including lifetime tracking, the porting management server 150 can track the user through events like ports, number changes, suspends and resumes that would break any other form of tracking. Additionally, because disconnect events are accessible, a freeze could not accidentally carry-through to a new user who got a phone number after the prior owner of the number disconnected.

The use of the freeze/challenge can be used in any other application, such as preventing credit card fraud discussed in the examples above. Because the device management system 100 can associate the phone number to the user through name and address (e.g., via record matching, fuzzy matching, and so on), and through that, to also connect multiple devices to the same person.

In some embodiments, the injection of the challenge into the pre-port stream is enabled though the use of application programming interfaces (APIs). In a preferred embodiment, these APIs are only available to carrier grade users. The challenge can also set a predetermined time limit for responding, such as within hundreds of milliseconds.

For example, once a user has enrolled in the device management system 100, they could create a more general freeze across, for example, a credit report. When a credit report is then requested, the credit company will call the API, and if the account is under a credit freeze, the porting management server 150 can take multiple actions (e.g., a "soft" or "hard" freeze as described above). For example, if the freeze is of a "hard" form, then the credit request will be immediately denied, and the credit agency should not perform the credit check. Additionally, an SMS or phone alert can be sent to the user, since the porting management server 150 has access to all the user's devices, to inform them that a credit request has occurred.

If a "soft" freeze is in effect, then the user can be contacted via their device using SMS or other method to request that they allow the credit check. When the user clicks on the link in the SMS, the SIM based authentication can be used to ensure that the correct device is being used, preventing SMS fraud. If the user approves the credit check, the API will return a positive response to the credit agency and they can release the credit report.

Although several examples are provided, the device management system 100 can be extended to many other uses. Additional examples include credit cards, which could be frozen using your phone through the porting management server 150, across multiple credit cards simultaneously, for example in the case of losing a wallet. Another example includes controlling purchases of a sub-account (e.g., a child's phone account) before they purchase apps or in-game purchases, across multiple devices. Or even controlling whether a game will start for their sub-account. Any situation where money changes hands, or some sort of permission is required can be driven through the device management system 100.

Because all these applications can be controlled through a single, simple interface, the device management system 100 allows a much simpler interface than all current solutions, which are usually tied to a single company at a time. For example, Discover® currently offers a means of freezing a credit card, but it works only for a single card, and you must know your card number and have a valid account to do it. If you have two credit cards, you need to go through the process twice if you lose a wallet. Multiple card companies require separate accounts and separate freezes. And if someone calls the company they will unlock it manually since they cannot know the phone is not correct.

The device management system 100 avoids all these pitfalls through the intimate knowledge of the phone, and by offering the freeze as an industry-wide service.

The freeze/challenge can take multiple forms, a "hard" freeze is one where all transactions are denied by default. A "soft" freeze where transactions trigger a request for allowance, and a "notification" freeze, where transactions are allowed, but each request triggers a notification to the phone enrolled in the device management system 100.

Figure 5:
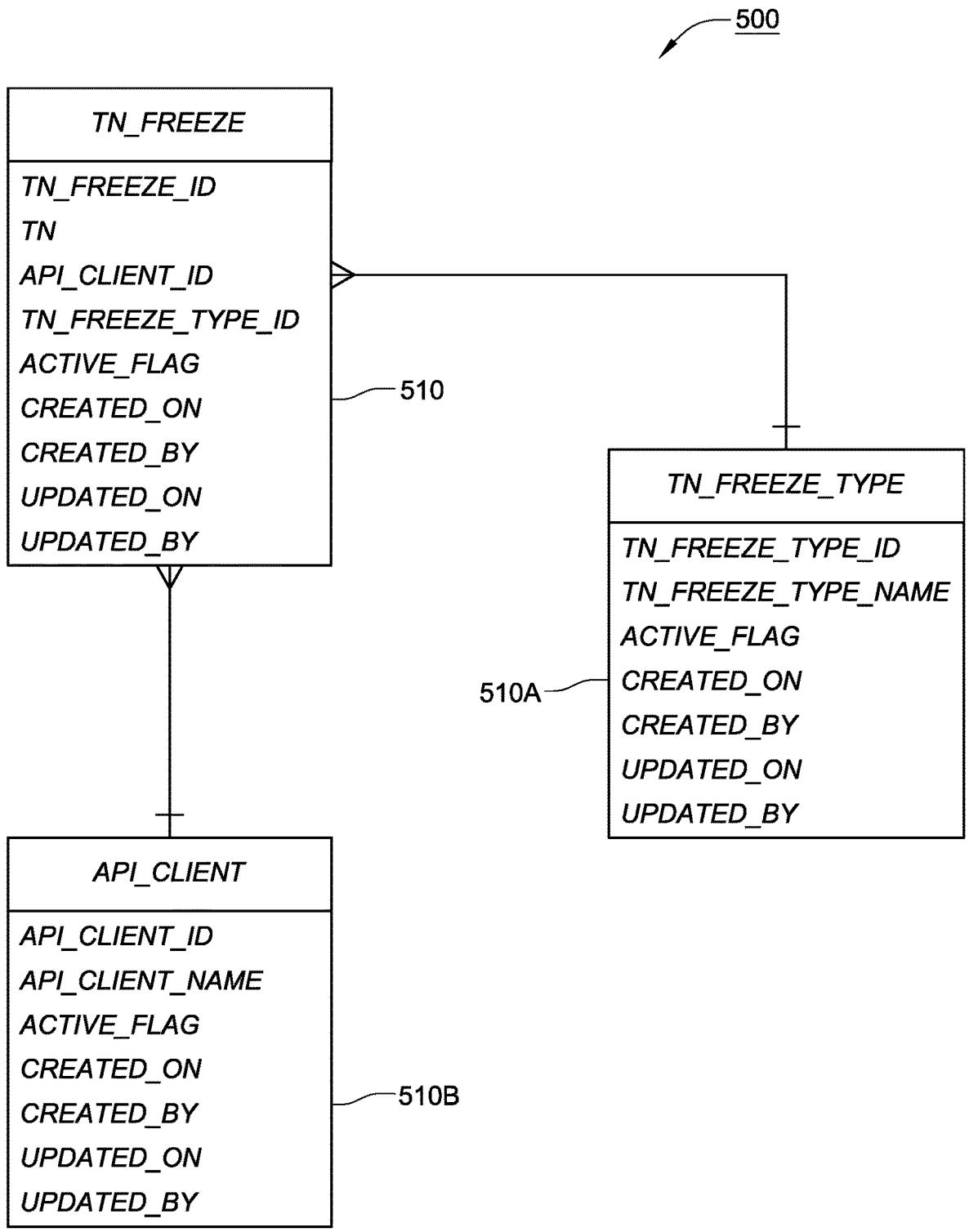
FIG. 5 is an exemplary top-level block diagram illustrating one embodiment of a data record for use with the device management system of FIG. 1.

Freezes can be open-ended, meaning that the freeze remains in effect until it is cancelled, time limited, where an end-date is specified, and the freeze is lifted at that time. It is also possible to do a timed un-freeze where transactions will be allowed for a certain period of time. In some embodiments, a freeze can be flagged through one or more database records 500, such as shown in FIG. 5. For example, as shown, an account can be represented by a selected database record 500. The attributes of the selected database record 500 determines the freeze state (e.g., active/inactive), the types/levels of freeze applied (e.g., hard or soft freeze), soft freeze preferences (e.g., notify or alert for approval), and so on. A selected freeze can be created against an "alias," which alias represents a unique identifier for identifying a subscribing device. The alias can be similar to a "phone account"—but not necessarily to a phone number, as the alias persists through ports, phone number changes, suspends, resumes, etc.

In some embodiments, a data table of alias with a flag for the type of freeze in effect. Since this alias can be used to associate a particular device, that device information can be used to trigger notifications, if requested, to the device. In the case of a hard freeze, all requests can be denied, and notification messages provided.

As shown, the data table can also include time of creation information, auditing information, and time-in-force settings, as desired.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A device management system, comprising:
    a porting management server coupled to an encrypted communication channel and in communication with a pre-porting network to intercept a porting request to include information to identify a phone number to be ported;
    wherein the porting management server is to be in communication with a data store to contain a plurality of identifiers of accounts to be monitored and wherein the porting management server is to query the plurality of identifiers to determine whether the intercepted porting request is associated with an account to be monitored and is further configured to issue a challenge over the pre-porting network responsive to intercepted port request relating to an account to be monitored;
    wherein the porting management server is further to communicate with a subscriber identity module (SIM) based communication network and to transmit a short message service (SMS) message to contain a network link to a communication device associated with an account to be monitored identified in response to the query and wherein the network link contained in the SMS message is to direct back to the porting management server;
    wherein the porting management server is further to receive a request generated by the network link from the communication device via the SIM based communication network and, responsive to receipt of the request, the porting management server is to test authentication of the communication device via SIM encryption information;
    wherein the porting management server is to send a challenge release to the pre-porting network in response to the communication device passing the authentication test.

2. The system of claim 1, wherein said porting management server is further to authenticate the communication device by querying for a current international mobile subscriber identifier (IMSI) associated with a mobile telephone number of the communication device and to compare at least the current IMSI and an IMSI associated at the time of the porting request with the mobile telephone number received responsive to the query.

3. The system of claim 1, wherein the porting management server is further to test authentication of the communication device by fuzzy matching at least a name associated with the account to be monitored.

4. The system of claim 3, wherein the porting management server is further to test authentication of the communication device by determining a distance score associated with the name.

5. The system of claim 1, wherein the porting management server is further to send notification to the communication device requesting the challenge release.

6. The system of claim 1, wherein the pre-porting network is to encrypt all communication and is to represent a virtual private network.

7. The system of claim 6, wherein communication across the pre-porting network is to be based on a pre-exchange of cryptographically large keys.

8. The system of claim 1, wherein the plurality of identifiers is to comprise one or more phone numbers associated with a name of the account to be monitored.

9. The system of claim 1, wherein the plurality of identifiers is to comprise one or more phone numbers associated with a name of the account to be monitored.

10. A method for challenging a porting request of a communication device being identifiable by a carrier account on a first carrier seeking to port to a second carrier, the method comprising:
    intercepting the porting request via a porting management server, the porting request being transmitted utilizing a pre-porting network and including at least a phone number and a name associated with the communication device; and
    identifying at least one of the name and the phone number from a predetermined plurality;
    determining whether to initiate a soft freeze or a hard freeze, wherein a hard freeze denies the porting request immediately, and wherein a soft freeze temporarily halts the freeze;
    querying for a current international mobile subscriber identifier (IMSI) associated with the phone number of the communication device and comparing at least a current IMSI and an IMSI associated at the time of the porting request with a phone number received in response to the query to establish a proof of possession of the communication device;
    fuzzy matching at least the name associated with the communication device to establish a proof of ownership of the communication device;

determining device change events of the communication device to establish a trust score; and issuing the challenge to the porting request via the porting management server based on the identified at least one of the name or the phone number from the predetermined plurality, the determination of the hard or soft freeze, the proof of possession, the proof of ownership, and the trust score.

11. The method of claim 10, further comprising releasing the challenge to the pre-porting network responsive to the communication device passing an authentication test.

12. A device management system, comprising:
a porting management server coupled to an encrypted communication channel and in communication with a pre-porting network for intercepting a porting request to include information to identify a phone number to be ported;
wherein the porting management server is to communicate with a data store that is to contain a plurality of identifiers to describe accounts to be monitored and wherein the porting management server is to query the plurality of identifiers to determine whether the intercepted port request is to be associated with an account to be monitored and is further to issue a challenge over the pre-porting network responsive to the intercepted port request relating to an account to be monitored;
wherein the porting management server is further to test authentication of a communication device associated with an account to be monitored identified in response to the query that is to utilize subscriber identity module (SIM) encryption information;
wherein the porting management server is to send a challenge release to the pre-porting network responsive to the communication device passing the authentication test.

13. The system of claim 12, wherein the porting management server is further to communicate with a SIM based communication network and to transmit a short message service (SMS) message that is to include a network link to a communication device associated with an account to be monitored identified in response to the query, and wherein the network link contained in the SMS message is to direct back to the porting management server.

14. The system of claim 13, wherein the porting management server is further to receive a request generated by the network link from the communication device via the SIM based communication network and, upon receipt of the request, the porting management server to test authentication of the communication device using SIM encryption information.

15. The system of claim 12, wherein said porting management server is further to authenticate the communication device by querying for a current international mobile subscriber identifier (IMSI) associated with a mobile telephone number of the communication device and comparing at least the current IMSI and an IMSI associated at the time of the porting request with the mobile telephone number received responsive to the query.

16. The system of claim 12, wherein the porting management server is further to test authentication of the communication device by fuzzy matching at least a name associated with the account to be monitored.

17. The system of claim 16, wherein the porting management server is further to test authentication of the communication device by determining a distance score associated with the name.

18. The system of claim 12, wherein the porting management server is further to send notification to the communication device requesting a challenge release.

19. The system of claim 12, wherein the pre-porting network is further to encrypt all communication and is to represent a virtual private network.

20. The system of claim 19, wherein communication across the pre-porting network is to be based on a pre-exchange of cryptographically large keys.

21. A device management system, comprising: a porting management server coupled to an encrypted communication channel and in communication with a pre-porting network and a data store that is to contain a plurality of identifiers describing accounts to be monitored, the porting management server being configured to query the plurality of identifiers to determine whether a selected communication device is to be associated with an account to be monitored and further configured to place the selected communication device into a pre-port state responsive to being related to an account to be monitored;
wherein the porting management server is further to communicate with a subscriber identity module (SIM) based communication network and to transmit a short message service (SMS) message that is to include a network link to the selected communication device and wherein the network link that is to be included in the SMS message is to direct back to the porting management server;
wherein the porting management server is further to receive a request generated by the network link from the selected communication device via the SIM based communication network and, upon receipt of the request, the porting management server is to test authentication of the selected communication device using SIM encryption information; and
wherein the porting management server is to send a challenge release to the pre-porting network in response to the selected communication device passing the authentication test.

* * * * *